US012625816B2

(12) United States Patent
Sridharan et al.

(10) Patent No.: US 12,625,816 B2
(45) Date of Patent: May 12, 2026

(54) PREFETCH THROTTLING BASED ON CACHE THRASHING

(71) Applicant: Advanced Micro Devices, Inc., Santa Clara, CA (US)

(72) Inventors: Aswinkumar Sridharan, Chennai (IN); Anasua Bhowmik, Bangalore (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 145 days.

(21) Appl. No.: 18/619,818

(22) Filed: Mar. 28, 2024

(65) Prior Publication Data

US 2025/0307157 A1 Oct. 2, 2025

(51) Int. Cl.
*G06F 12/08* (2016.01)
*G06F 12/0811* (2016.01)
*G06F 12/0862* (2016.01)

(52) U.S. Cl.
CPC ...... *G06F 12/0862* (2013.01); *G06F 12/0811* (2013.01); *G06F 2212/6028* (2013.01)

(58) Field of Classification Search
CPC .......................... G06F 12/0862; G06F 12/0811
See application file for complete search history.

(56) References Cited

U.S. PATENT DOCUMENTS

| | | | | | |
|---|---|---|---|---|---|
| 2002/0143989 | A1* | 10/2002 | Huitema | ................. | H04L 61/58 |
| | | | | | 709/217 |
| 2003/0070045 | A1* | 4/2003 | Dwyer | .................... | G06F 12/12 |
| | | | | | 711/E12.07 |

OTHER PUBLICATIONS

Ebrahimi, Eiman , et al., "Coordinated control of multiple prefetchers in multi-core systems", MICRO 42: Proceedings of the 42nd Annual IEEE/ACM International Symposium on Microarchitecture [retrieved Dec. 12, 2023]. Retrieved from the Internet <https://doi.org/10.1145/1669112.1669154>, Dec. 2009, 11 pages.

(Continued)

*Primary Examiner* — Jae U Yu

(74) *Attorney, Agent, or Firm* — FIG. 1 Patents

(57) ABSTRACT

In accordance with the described techniques, a processor includes a cache system having a level two cache, and a hardware prefetcher associated with the level two cache. The hardware prefetcher monitors a workload that includes accesses to the level two cache, and measures a degree of thrashing exhibited by the workload in the level two cache based on the accesses. Prefetch requests issued by the hardware prefetcher are throttled based on the degree of thrashing being greater than or equal to a thrashing threshold.

20 Claims, 4 Drawing Sheets

200 ⟶

(56)     References Cited

OTHER PUBLICATIONS

Qureshi, Moinuddin K, et al., "Utility-Based Cache Partitioning: A Low-Overhead, High-Performance, Runtime Mechanism to Partition Shared Caches", 2006 39th Annual IEEE/ACM International Symposium on Microarchitecture (MICRO'06) [retrieved Dec. 12, 2023]. Retrieved from the Internet <https://doi.org/10.1109/MICRO.2006.49>, Dec. 2006, 10 pages.

Sridharan, Aswinkumar , et al., "Discrete Cache Insertion Policies for Shared Last Level Cache Management on Large Multicores", 2016 IEEE International Parallel and Distributed Processing Symposium (IPDPS) [retrieved Dec. 12, 2023]. Retrieved from the Internet <https://doi.org/10.1109/IPDPS.2016.30>, May 2016, 24 pages.

Srinath, Santhosh , et al., "Feedback Directed Prefetching: Improving the Performance and Bandwidth-Efficiency of Hardware Prefetchers", 2007 IEEE 13th International Symposium on High Performance Computer Architecture [retrieved Dec. 12, 2023]. Retrieved from the Internet <https://doi.org/10.1109/HPCA.2007.346185>, Feb. 2007, 12 pages.

* cited by examiner

100

Device 102

Processor 104

Execution Units 112

Registers 118

↕

Load-Store Units 114

↕

Cache System 116

Cache Levels 120

Level One Cache 122

Level Two Cache 124

Hardware Prefetcher 128

Throttling Logic 130

Last Level Cache 126

↕

Memory System 106

Volatile Memory 108

Non-Volatile Memory 110

200

Figure 3:
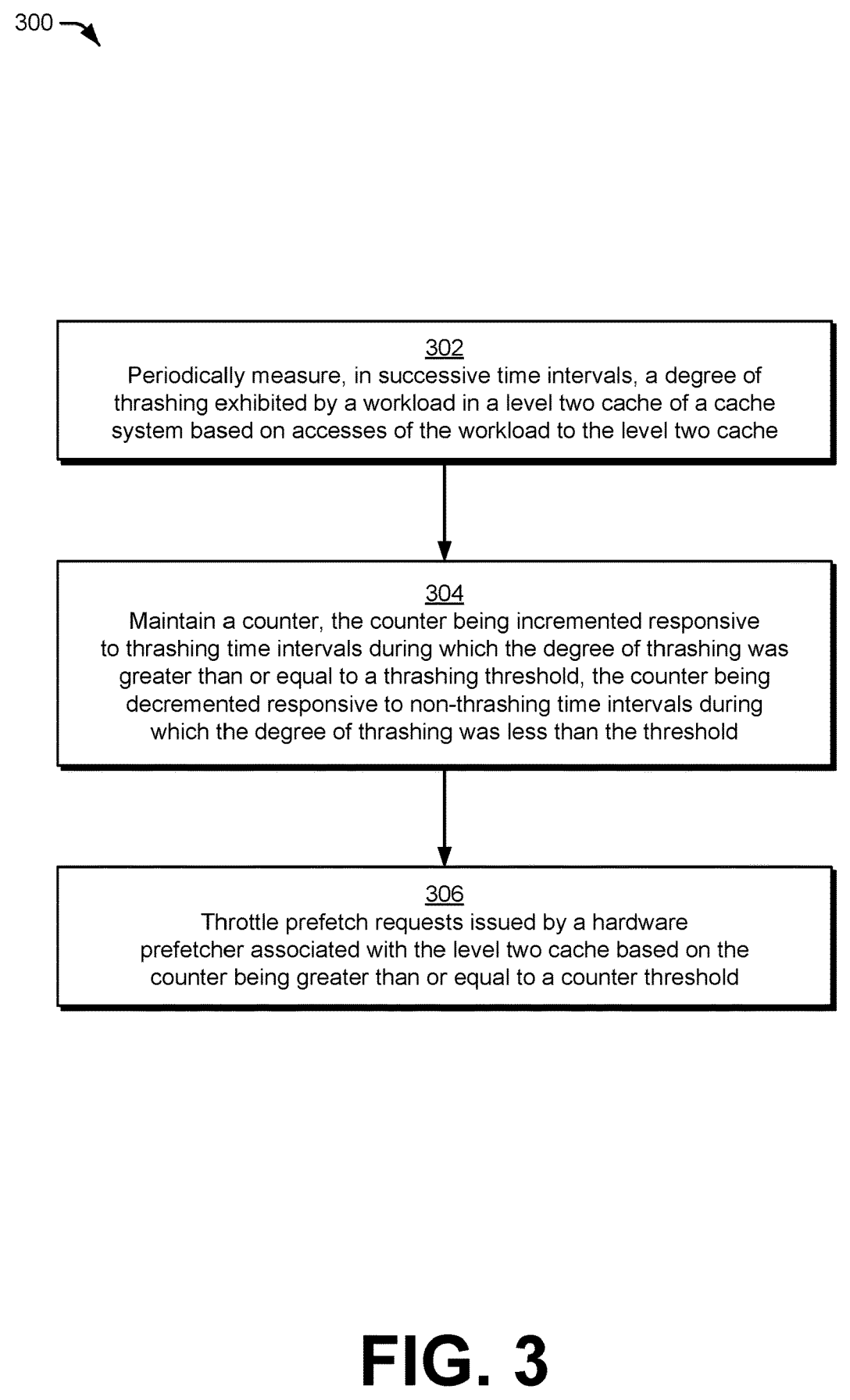

300

302
Periodically measure, in successive time intervals, a degree of thrashing exhibited by a workload in a level two cache of a cache system based on accesses of the workload to the level two cache 304
Maintain a counter, the counter being incremented responsive to thrashing time intervals during which the degree of thrashing was greater than or equal to a thrashing threshold, the counter being decremented responsive to non-thrashing time intervals during which the degree of thrashing was less than the threshold 306
Throttle prefetch requests issued by a hardware prefetcher associated with the level two cache based on the counter being greater than or equal to a counter threshold

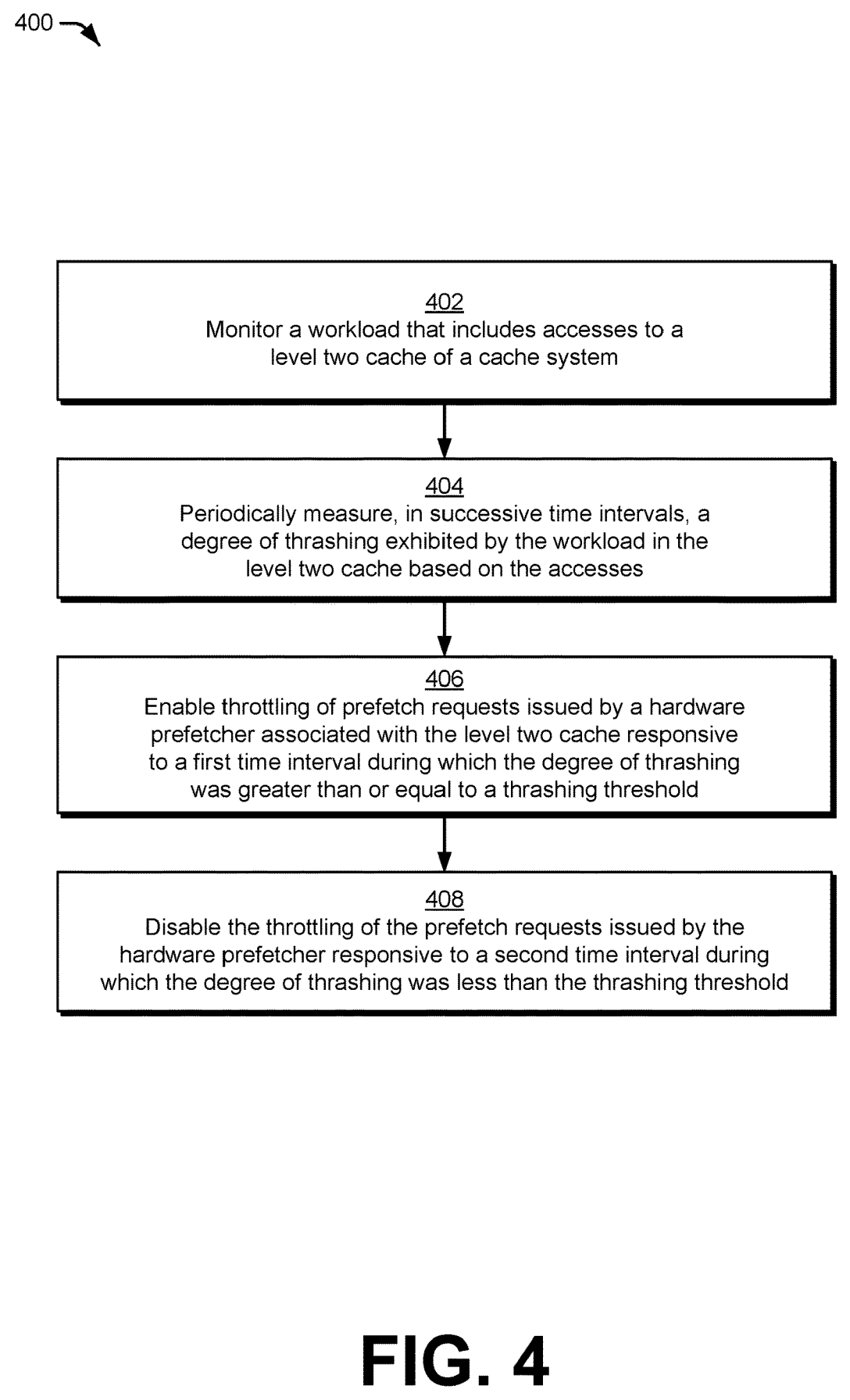

402
Monitor a workload that includes accesses to a
level two cache of a cache system

↓

404
Periodically measure, in successive time intervals, a
degree of thrashing exhibited by the workload in the
level two cache based on the accesses

↓

406
Enable throttling of prefetch requests issued by a hardware
prefetcher associated with the level two cache responsive
to a first time interval during which the degree of thrashing
was greater than or equal to a thrashing threshold

↓

408
Disable the throttling of the prefetch requests issued by the
hardware prefetcher responsive to a second time interval during
which the degree of thrashing was less than the thrashing threshold

FIG. 4

PREFETCH THROTTLING BASED ON CACHE THRASHING

BACKGROUND

Prefetching is a technique implemented by processors to reduce memory access latency. To do so, prefetchers fetch data that is predicted to be used by a workload into a memory source that is accessible with increased speed, e.g., as compared to the memory source from which the data is fetched. In various scenarios, however, prefetching is detrimental to performance, for instance, when prefetch requests cause cache pollution, saturate memory access bandwidth, are predicted inaccurately, and/or are fetched in an untimely manner. Accordingly, processors utilize prefetch throttling to reduce and/or eliminate prefetching in scenarios in which prefetching is detrimental to performance.

BRIEF DESCRIPTION OF THE DRAWINGS

FIG. 3 depicts a procedure in an example implementation of prefetch throttling based on cache thrashing.

FIG. 4 depicts a procedure in an example implementation of prefetch throttling based on cache thrashing.

DETAILED DESCRIPTION

Overview

Figure 1:
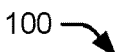
FIG. 1 is a block diagram of a non-limiting example system to implement prefetch throttling based on cache thrashing.

A system includes a processor communicatively coupled to a memory system having a volatile memory and a non-volatile memory. The processor includes a cache system having multiple cache levels. For example, the cache system includes level one caches and level two caches that are private to respective cores of the processor, and a last level cache that is shared among the multiple cores of the processor. The processor further includes a hardware prefetcher associated with the level two cache. Broadly, the hardware prefetcher of the level two cache is configured to prefetch data that is predicted to be accessed by a workload from a slower memory source in terms of memory access speed (e.g., the last level cache, the volatile memory, or the non-volatile memory) into the level two cache. Further, the hardware prefetcher of the level two cache includes throttling logic configured to reduce and/or eliminate prefetch requests issued by the hardware prefetcher.

Broadly, thrashing occurs in the level two cache when the amount of data entering the level two cache exceeds capacity constraints. Thrashing in the level two cache is a data access pattern in which a workload frequently evicts data from the level two cache to make room for incoming data, and re-fetches the evicted data soon thereafter. As a result, the workload experiences frequent cache misses despite the workload having accessed the requested data recently, which causes performance degradation for the system. In these scenarios, there is significant traffic in the communication channels between the level two cache and the last level cache (which are non-shared or private to a respective core of the processor). Prefetching while a workload is thrashing the level two cache is detrimental to performance because prefetched data further occupies memory in the level two cache (leading to cache pollution), and prefetch requests further dominate the access bandwidth of the level two cache (e.g., the communication channels between level two cache and the last level cache), thereby delaying demand requests.

Conventional techniques throttle prefetch requests based on system bandwidth usage (e.g., the communication channels that are shared among the multiple cores of the processor), accuracy and timeliness of prefetch requests, and prefetch caused cache pollution. However, these metrics do not capture a degree of thrashing in the level two cache, or bandwidth usage in the non-shared communication channels between the level two cache and the level three cache. For these reasons, conventional prefetchers often elect not to throttle prefetch requests in scenarios in which a workload thrashes the level two cache, but fits within the last level cache. By failing to throttle prefetch requests in these scenarios, conventional throttlers cause higher degrees of thrashing in the level two cache, delay of demand requests, more frequent cache misses, and overall performance degradation.

Accordingly, the throttling logic of the described techniques is configured to throttle prefetch requests issued by the hardware prefetcher based on a workload exhibiting thrashing behavior in the level two cache. To do so, the throttling logic monitors accesses to the level two cache. The accesses to the level two cache include, for example, demand requests (e.g., load and/or store requests issued by the processor) and prefetch requests, e.g., issued by hardware prefetchers of the level one cache and/or the level two cache. The throttling logic periodically measures, in successive time intervals, a degree of thrashing exhibited by the workload in the level two cache. The degree of thrashing is based on a number of the accesses having different memory addresses, and the number is counted from a monitored subset of cache indices of the level two cache.

After each respective time interval, the throttling logic compares the degree of thrashing exhibited by the workload in the level two cache to a thrashing threshold. If the degree of thrashing is greater than or equal to the thrashing threshold, the throttling logic increments a counter. However, if the degree of thrashing is less than the thrashing threshold, the throttling logic decrements the counter. Responsive to updating the counter after a respective time interval is terminated, the throttling logic compares the counter to a counter threshold. If the counter is greater than or equal to the counter threshold, the throttling logic throttles prefetch requests issued by the hardware prefetcher for one or more subsequent time intervals. If, however, the counter is less than the counter threshold, throttling of prefetch requests is disabled for one or more subsequent time intervals.

Unlike conventional techniques, the throttling logic of the described techniques throttles prefetch requests issued by the hardware prefetcher in scenarios in which a workload thrashes the level two cache, but fits within the last level cache. This is achieved by directly monitoring the thrashing behavior of a workload in the level two cache, and making throttling decisions based on the monitored thrashing behavior. Accordingly, the described techniques improve computer performance over conventional techniques in these scenarios by reducing thrashing in the level two cache, expediting processing of demand requests, and increasing cache hit rate.

In some aspects, the techniques described herein relate to a processor, comprising a cache system including a level two cache, and prefetching circuitry associated with the level two cache, the prefetching circuitry configured to monitor a workload that includes accesses to the level two cache, measure a degree of thrashing exhibited by the workload in the level two cache based on the accesses, and throttle prefetch requests issued by the prefetching circuitry based on the degree of thrashing being greater than or equal to a thrashing threshold.

In some aspects, the techniques described herein relate to a processor, wherein the level two cache includes multiple cache indices, and the prefetching circuitry is configured to measure the degree of thrashing based on the accesses to a subset of the multiple cache indices.

In some aspects, the techniques described herein relate to a processor, wherein to measure the degree of thrashing, the prefetching circuitry is configured to count a number of the accesses to cache indices of the subset having different memory addresses, and calculate a working set size as an average of the number across the cache indices in the subset.

In some aspects, the techniques described herein relate to a processor, wherein the thrashing threshold is a function of cache associativity of the level two cache, and the prefetch requests are throttled based on the working set size being greater than or equal to the thrashing threshold.

In some aspects, the techniques described herein relate to a processor, wherein the prefetching circuitry is configured to periodically measure, in successive time intervals, the degree of thrashing, and compare, after each respective time interval, the degree of thrashing exhibited by the workload during the respective time interval to the thrashing threshold.

In some aspects, the techniques described herein relate to a processor, wherein the prefetching circuitry is configured to throttle the prefetch requests issued by the prefetching circuitry during a time interval based on the degree of thrashing being greater than or equal to the thrashing threshold during an immediately previous time interval.

In some aspects, the techniques described herein relate to a processor, wherein the prefetching circuitry is configured to disable throttling of the prefetch requests issued by the prefetching circuitry during a time interval based on the degree of thrashing being less than the thrashing threshold during an immediately previous time interval.

In some aspects, the techniques described herein relate to a processor, wherein the prefetching circuitry is configured to increment a counter responsive to thrashing time intervals during which the degree of thrashing was greater than or equal to the thrashing threshold, and decrement the counter responsive to non-thrashing time intervals during which the degree of thrashing exhibited by the workload was less than the thrashing threshold.

In some aspects, the techniques described herein relate to a processor, wherein the prefetching circuitry is configured to throttle the prefetch requests issued by the prefetching circuitry based on the counter being greater than or equal to a counter threshold.

In some aspects, the techniques described herein relate to a processor, wherein the prefetching circuitry is configured to disable throttling of the prefetch requests issued by the prefetching circuitry based on the counter being less than a counter threshold.

In some aspects, the techniques described herein relate to a system, comprising a memory system, and a processor communicatively coupled to the memory system, the processor including a cache system having a level two cache, the level two cache including prefetching circuitry configured to perform operations including periodically measuring, in successive time intervals, a degree of thrashing exhibited by a workload in the level two cache based on accesses of the workload to the level two cache, maintaining a counter, the counter being incremented responsive to thrashing time intervals during which the degree of thrashing was greater than or equal to a thrashing threshold, the counter being decremented responsive to non-thrashing time intervals during which the degree of thrashing was less than the thrashing threshold, and throttling prefetch requests issued by the prefetching circuitry based on the counter being greater than or equal to a counter threshold.

In some aspects, the techniques described herein relate to a system, wherein the level two cache includes multiple cache indices, and the degree of thrashing is measured, for a respective time interval, based on the accesses to a subset of the multiple cache indices during the respective time interval.

In some aspects, the techniques described herein relate to a system, wherein the degree of thrashing is measured, for the respective time interval, by counting a number of the accesses to cache indices of the subset having different memory addresses during the respective time interval, and calculating a working set size as an average of the number across the cache indices in the subset.

In some aspects, the techniques described herein relate to a system, wherein counting the number for a particular cache index of the subset during the respective time interval includes sampling the accesses to the particular cache index until a maximum number of the accesses have been sampled, the maximum number being a function of cache associativity of the level two cache, and counting, responsive to completion of the respective time interval, the number from the sampled accesses.

In some aspects, the techniques described herein relate to a system, wherein the thrashing threshold is a function of cache associativity of the level two cache, and the counter is incremented or decremented based on a comparison of the working set size to the thrashing threshold.

In some aspects, the techniques described herein relate to a system, the operations further comprising disabling the throttling of the prefetch requests issued by the prefetching circuitry based on the counter being less than the counter threshold.

In some aspects, the techniques described herein relate to a system, wherein the counter is a saturating counter associated with a range of values, the saturating counter remaining at a value to which the saturating counter is set responsive to being prompted to increment or decrement the saturating counter beyond the range of values.

In some aspects, the techniques described herein relate to a method, comprising monitoring, by a hardware prefetcher associated with a level two cache of a cache system, a workload that accesses to the level two cache, periodically measuring, by the hardware prefetcher and in successive time intervals, a degree of thrashing exhibited by the workload in the level two cache based on the accesses, enabling, by the hardware prefetcher, throttling of prefetch requests issued by the hardware prefetcher responsive to a first time interval during which the degree of thrashing was greater than or equal to a thrashing threshold, and disabling, by the hardware prefetcher, the throttling of the prefetch requests issued by the hardware prefetcher responsive to a second time interval during which the degree of thrashing was less than the thrashing threshold.

In some aspects, the techniques described herein relate to a method, wherein the level two cache includes multiple cache indices, and periodically measuring the degree of thrashing includes counting, during a respective time interval, a number of the accesses to a monitored subset of the multiple cache indices having different memory addresses, and calculating a working set size as an average of the number across cache indices in the monitored subset.

In some aspects, the techniques described herein relate to a method, wherein the throttling of the prefetch requests is enabled based on the working set size calculated for the first time interval being greater than or equal to the thrashing threshold, and the throttling of the prefetch requests is disabled based on the working set size calculated for the second time interval being less than the thrashing threshold.

FIG. 1 is a block diagram of a non-limiting example system 100 to implement prefetch throttling based on cache thrashing. The system 100 includes a device 102 having a processor 104, and a memory system 106 having a volatile memory 108 and a non-volatile memory 110. The device 102 is configurable in a variety of ways. Examples of the device 102 include, by way of example and not limitation, computing devices, servers, mobile devices (e.g., wearables, mobile phones, tablets, laptops), processors (e.g., graphics processing units, central processing units, and accelerators), digital signal processors, disk array controllers, hard disk drive host adapters, memory cards, solid-state drives, wireless communications hardware connections, Ethernet hardware connections, switches, bridges, network interface controllers, and other apparatus configurations. It is to be appreciated that in various implementations, the device 102 is configured as any one or more of those devices listed just above and/or a variety of other devices without departing from the spirit or scope of the described techniques.

In accordance with the described techniques, the processor 104 and the memory system 106 are coupled to one another via one or more wired and/or wireless connections. Example wired connections include, but are not limited to, buses (e.g., a data bus), interconnects, traces, and planes. The processor 104 is an electronic circuit that reads, translates, and executes requests of a program, e.g., an application, operating system, virtual machine, container, and so on. Examples of the processor 104 include, but are not limited to including, central processing units (CPUs), graphics processing units (GPUs), Field Programmable Gate Arrays (FPGAs), Application Specific Integrated Circuits (ASICs), digital signal processors (DSPs), and accelerator devices.

The volatile memory 108 and the non-volatile memory 110 are devices and/or systems that are used to store information, such as for use by the processor 104. By way of example, the processor 104 includes a memory module (e.g., a Transflash memory module, a single in-line memory module (SIMM), or a dual in-line memory module (DIMM), and the memory module is a circuit board (e.g., a printed circuit board) on which the volatile memory 108 and the non-volatile memory 110 are mounted. Further, the volatile memory 108 and the non-volatile memory 110 correspond to semiconductor memory where data is stored within memory cells on one or more integrated circuits.

Broadly, the volatile memory 108 retains data as long as the device 102 is connected to power, and the data is accessible relatively faster than the non-volatile memory 110. Examples of the volatile memory 108 include random-access memory (RAM), dynamic random-access memory (DRAM), synchronous dynamic random-access memory (SDRAM), and static random-access memory (SRAM). Further, the non-volatile memory 110 retains data even after the device 102 is disconnected from power, but is accessible relatively slower than the volatile memory 108. Examples of the non-volatile memory include solid state disks (SSD), flash memory, read-only memory (ROM), programmable read-only memory (PROM), erasable programmable read-only memory (EPROM), and electronically erasable programmable read-only memory (EEPROM).

As shown, the processor 104 includes one or more execution units 112, one or more load-store units 114, and a cache system 116 that are coupled to one another via one or more wired and/or wireless connections. Broadly, an execution unit 112 is representative of functionality implemented in hardware (e.g., electronic circuitry) of the processor 104 to perform specific types of operations, such as arithmetic and logic operations. Further, a load-store unit 114 is representative of functionality implemented in hardware (e.g., electronic circuitry) of the processor 104 to perform load operations and store operations. More specifically, the execution units 112 and the load-store units 114 perform respective operations based on requests received through execution of software programs, e.g., applications, operating systems, virtual machines, containers, and so on. By way of example, requests are generated and forwarded to the execution units 112 and/or the load-store units 114 by a control unit (not depicted) of the processor 104.

Load requests instruct the load-store units 114 to load data from the cache system 116, the volatile memory 108, and/or the non-volatile memory 110 into registers 118 of the one or more execution units 112. Once loaded into the registers 118, requests (e.g., arithmetic and logic requests) are executable by the execution units 112 to perform corresponding operations (e.g., arithmetic and logic operations) on the data that is present in the registers 118. Store requests instruct the load-store units 114 to store data from the registers 118 (e.g., after the data has been processed by the execution units 112) back to the cache system 116, the volatile memory 108, and/or the non-volatile memory 110. Load requests and store requests issued by the load-store units 114 as part of executing a runtime program are referred to herein collectively as "demand requests."

As shown, the cache system 116 includes multiple cache levels 120, examples of which are illustrated as a level one cache 122, a level two cache 124, and a last level cache 126. By way of example, the processor 104 is a multi-core processor, and each respective core includes a level one cache 122 and a level two cache 124 that are private to a respective core of the processor. Furthermore, the processor 104 includes a last level cache 126 that is shared among the multiple cores of the processor 104. Notably, the cache system 116 (e.g., including the level one caches 122, the level two cache 124, and the last level cache 126) corresponds to semiconductor memory where data is stored within memory cells on one or more integrated circuits. Broadly, the higher cache levels 120 (e.g., level one cache 122) are accessible (e.g., for loading and/or storing data) relatively faster than the lower cache levels 120 (e.g., the last level cache 126), but the lower cache levels 120 have more memory capacity than the higher cache levels 120. It is to be appreciated that the cache system 116 of the processor 104 includes differing numbers of caches and different hierarchical structures without departing from the spirit or scope of the described techniques.

Furthermore, the cache system 116 is accessible (e.g., for loading and/or storing data) relatively faster than data stored in the memory system 106. In sum, the various memory sources of the processor 104 are ordered from fastest access speed to slowest access speed in the following order: (1) the level one cache 122, (2) the level two cache 124, (3) the last level cache 126, (4) the volatile memory 108, (5) the non-volatile memory 110. Given the above, a load-store unit 114 executes a load request that includes a memory address by progressively checking the memory sources for the data identified by the memory address in the aforementioned order. If the data is present in a memory source, the load-store unit 114 loads the data from the memory source into the registers 118, and if not, the load-store unit 114 proceeds to checking whether the data is present in the next memory source of the aforementioned order.

As shown, the level two cache 124 includes a hardware prefetcher 128 which is representative of functionality implemented in hardware of the processor 104 to prefetch data that is predicted to be used (e.g., in the near future) by a workload of a runtime program. For instance, the hardware prefetcher 128 is an electronic circuit that monitors memory access patterns of the workload, predicts which memory addresses are likely to be accessed based on the observed memory access patterns, and issues prefetch requests to fetch data of the predicted memory address from a slower memory source in terms of access speed (e.g., the last level cache 126, the volatile memory 108, or the non-volatile memory 110) into the level two cache 124. Similar to a load request, a prefetch request to a predicted memory address is executed by progressively checking the slower memory sources (in terms of data access speed) for the data identified by the predicted memory address in the aforementioned order. Examples of the hardware prefetcher 128 include, but are not limited to including, stream prefetchers, sequential prefetchers, stride prefetchers, adjacent-line prefetchers, Markov prefetchers, spatial prefetchers, and temporal prefetchers.

Although not depicted, it is to be appreciated that the level one cache 122 and the last level cache 126 each include a hardware prefetcher 128 having similar functionality. Additionally or alternatively, the hardware prefetcher 128 associated with the level two cache 124 prefetches data from the volatile memory 108 and/or the non-volatile memory 110 into each of the various cache levels 120 of the cache system 116. Regardless of configuration, the prefetch requests issued by the hardware prefetcher 128 reduce memory access latency and improve overall computer performance by fetching data that is about to be used by the workload to a faster memory source (in terms of memory access speed) in various implementation scenarios.

However, aggressive prefetching protocols are often detrimental to performance, for instance, when prefetch requests cause cache pollution, saturate memory access bandwidth, are predicted inaccurately, and/or are fetched in an untimely manner. Notably, prefetch requests cause cache pollution when the prefetch requests evict data from the level two cache 124 to make room for prefetched data, and the evicted data is used by the workload soon thereafter. Further, prefetch requests saturate memory access bandwidth by occupying communication channels between the various memory sources, thereby delaying demand requests. Inaccurate prefetch requests fetch data from memory addresses that are, in fact, not used by the workload within a certain number of processor cycles. Untimely prefetch requests fetch data from memory addresses that are used by the workload, but do so after demand requests are issued for the prefetched data.

Given the above, throttling logic 130 is implemented in the hardware prefetcher 128 to reduce and/or eliminate the issuing of prefetch requests by the hardware prefetcher 128. Conventional techniques throttle prefetch requests by monitoring the accuracy and timeliness of prefetch requests, prefetch caused pollution, and system bandwidth usage. Notably, system bandwidth usage refers to the usage of communication channels that are shared among the multiple cores of the processor 104, e.g., between the last level cache

126 and the memory system 106. Given the above, conventional throttlers often determine to throttle prefetch requests when the last level cache 126 is full (e.g., loaded) due to contention for shared system resources (e.g., memory in the last level cache 126 and system bandwidth) and increased system bandwidth usage. However, in scenarios in which the last level cache 126 is in an unloaded state, conventional throttlers often elect not to throttle prefetch requests due to decreased usage of system bandwidth.

Generally, thrashing in the level two cache 124 occurs when the amount of data entering the level two cache 124 exceeds capacity constraints. This leads to performance degradation based on a cycle of frequently evicting data from the level two cache 124 to make room for incoming data, and re-fetching the evicted data soon thereafter. In scenarios in which a workload thrashes the level two cache 124, there is significant bandwidth usage in the communication channels between the level two cache 124 and the last level cache 126 (which are non-shared or private to a respective core of the processor 104).

In various scenarios, workloads exhibit thrashing behavior in the level two cache 124, but fit within the last level cache 126. That is, a workload thrashes the level two cache 124, while the last level cache 126 remains in an unloaded state. However, the aforementioned factors typically monitored by conventional throttlers (e.g., accuracy, timeliness, prefetch caused pollution, and system bandwidth usage) fail to capture a degree of thrashing in the level two cache 124 or bandwidth usage in the non-shared communication channels between the level two cache 124 and the last level cache 126. Accordingly, conventional throttlers often elect not to throttle prefetch requests in these scenarios. By doing so, prefetch requests further occupy the communication channels between the level two cache 124 and the last level cache 126, while prefetched data further occupies memory in the level two cache 124. In other words, prefetching in these scenarios leads to higher degrees of thrashing in the level two cache 124, delayed demand requests, more numerous cache misses, and overall performance degradation.

To alleviate the disadvantages of conventional throttlers, the throttling logic 130 of the described techniques is configured to throttle prefetch requests issued by the hardware prefetcher 128 based on a workload exhibiting thrashing behavior in the level two cache 124. To do so, the throttling logic 130 monitors accesses to the level two cache 124. The monitored accesses include, for example, demand requests issued by the load-store units 114 that access the level two cache 124, and prefetch requests issued by hardware prefetchers associated with the level one cache 122 and/or the level two cache 124 that access the level two cache 124. The throttling logic 130 periodically measures, in successive time intervals, a degree of thrashing exhibited by the workload in the level two cache. Broadly, the degree of thrashing is a metric indicating an estimation of how frequently the workload reloads data into the level two cache 124 that was recently evicted therefrom. More specifically, the degree of thrashing exhibited by the workload during a time interval refers to an estimated number of data accesses during the time interval having different memory addresses per cache index, as further discussed below with reference to FIG. 2.

If the degree of thrashing meets or exceeds a thrashing threshold during one or more time intervals, the throttling logic 130 throttles prefetch requests issued by the hardware prefetcher 128. The throttling of the prefetch requests includes reducing the number of prefetch requests issued, or eliminating the issuing of prefetch requests entirely for one or more time intervals, in variations. If, however, the degree of thrashing falls below the thrashing threshold during one or more time intervals, the throttling logic 130 disables throttling of the prefetch requests. Given the above, the throttling logic 130 dynamically enables or disables prefetch throttling based on a degree of thrashing exhibited by the workload in the level two cache 124 at defined time intervals during execution of the workload, e.g., at runtime.

Thus, unlike conventional throttlers, the throttling logic 130 implemented in accordance with the described techniques throttles prefetch requests issued by the hardware prefetcher in scenarios in which a workload thrashes the level two cache 124, but fits within the last level cache 126. This is because the throttling logic 130 directly monitors the thrashing behavior of the workload exhibited at the level two cache 124. By throttling prefetch requests in the aforementioned scenarios, the throttling logic 130 causes fewer prefetch requests to occupy the communication channels between the level two cache 124 and the last level cache 126, and less memory of the level two cache 124 to be occupied by prefetched data. As compared to conventional techniques, therefore, the described techniques improve overall computer performance by reducing thrashing in the level two cache, expediting processing of demand requests, and increasing cache hit rate.

Figure 2:
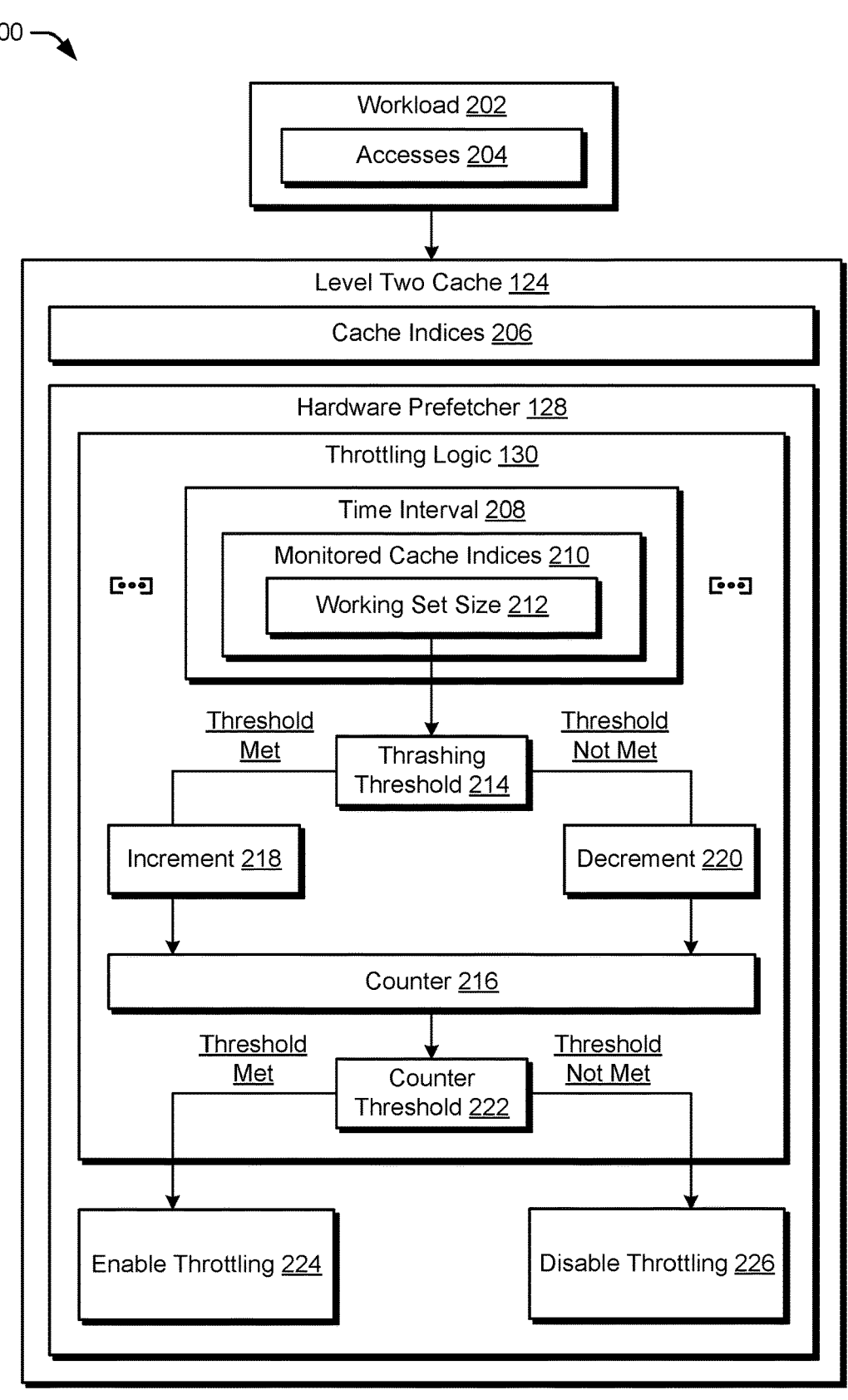
FIG. 2 depicts a non-limiting example in which throttling logic throttles prefetch requests issued by a hardware prefetcher of a level two cache.

FIG. 2 depicts a non-limiting example 200 in which throttling logic throttles prefetch requests issued by a hardware prefetcher of a level two cache. As shown, the example 200 includes the level two cache 124, the hardware prefetcher 128, and the throttling logic 130. The level two cache 124 is additionally illustrated as including a plurality of cache indices 206 where data is stored. Broadly, data in the level two cache 124 is stored in fixed length units of data called cache blocks, and a particular number of cache blocks are storable in each cache index 206 of the multiple cache indices 206. Notably, cache associativity of the level two cache 124 refers to the particular number of cache blocks that are storable in each cache index 206. In an illustrative and non-limiting example, each cache index 206 is capable of storing sixteen cache blocks, and as such, the cache associativity of the level two cache 124 is sixteen. In other words, the cache indices 206 (also referred to as cache sets) are portions of the level two cache 124 each capable of storing a particular number of cache blocks, e.g., the particular number is the cache associativity.

In accordance with the described techniques, the level two cache 124 receives a workload 202 including accesses 204 to the level two cache 124. The accesses 204 include demand requests issued by the load-store units 114 that access the level two cache 124. Notably, a store request accesses the level two cache 124 if it stores data in the level two cache 124, e.g., if the store request includes a memory address of the level two cache 124. Further, a load request accesses the level two cache 124 regardless of whether the data requested is present in the level two cache 124, e.g., regardless of whether the load request results in a cache hit or a cache miss. Additionally or alternatively, the accesses 204 include prefetch requests that access the level two cache 124. Similar to a load request, a prefetch request accesses the level two cache 124 regardless of whether the data requested is present in the level two cache 124, e.g., regardless of whether the prefetch request results in a cache hit or a cache miss.

The throttling logic 130 is configured to monitor these accesses 204 over distinct and successive time intervals 208. After each respective time interval 208, for instance, the throttling logic 130 measures a degree of thrashing exhibited by the workload in the level two cache 124 based on the accesses 204 to the level two cache 124 during the respective time interval. In variations, the time interval 208 is measured in units of time (e.g., seconds, milliseconds, microseconds, etc.) or by number of processor cycles.

To measure the degree of thrashing during a respective time interval 208, the throttling logic 130 selects a subset of the multiple cache indices 206, and monitors the accesses 204 to the cache indices 206 in the subset, e.g., while disregarding the accesses to other cache indices 206. The subset of cache indices 206 is referred to herein as the monitored cache indices 210. In at least one example, the monitored cache indices 210 are selected at random by the throttling logic 130. Further, the monitored cache indices 210 are different during different time intervals 208.

During the respective time interval and for each respective monitored cache index 210, the throttling logic 130 samples the accesses 204 to the respective monitored cache index 210. By way of example, the throttling logic 130 maintains a queue for each respective monitored cache index 210. Moreover, the throttling logic 130 adds an indication of an access 204 to the queue of the respective monitored cache index 210 based on the respective monitored cache index 210 being accessed.

In one or more implementations, the throttling logic 130 samples the accesses 204 until a maximum number of the accesses 204 have been sampled (e.g., added to the queue) or the respective time interval 208 ends, whichever occurs first. In various implementations, the maximum number of the accesses 204 is a function of the cache associativity of the level two cache 124. In at least one specific but non-limiting example, the maximum number is a multiplier of sixteen in relation to the cache associativity of the level two cache 124.

After the respective time interval, the throttling logic 130 counts, for each monitored cache index 210, a number of the sampled accesses 204 (e.g., the accesses 204 in the queue of the monitored cache index 210) having different memory addresses. In other words, the throttling logic 130 counts a number of unique accesses 204 to each monitored cache index 210 during the respective time interval. For example, multiple accesses 204 having a same memory address in the queue of the particular monitored cache index 210 count as just one unique access to the particular monitored cache index 210. It should be noted that differences between memory addresses are measured at cache line granularity. In other words, accesses 204 have different memory addresses when the memory addresses identify different cache lines. Similarly, multiple requests to a same cache line count as just one unique access 204.

In accordance with the described techniques, the throttling logic 130 is configured to calculate a working set size 212 for the workload 202 during the respective time interval 208. Notably, the working set size 212 calculated for the workload 202 during the respective time interval 208 is synonymous with the degree of thrashing exhibited by the workload 202 during the respective time interval. To calculate the working set size 212, the throttling logic 130 averages the number of the sampled accesses 204 having the different memory addresses across the monitored cache indices 210. Consider an example in which there are four monitored cache indices 206 during the respective time interval 208, and the total number of unique accesses across the monitored cache indices 206 is one-hundred. In this example, the throttling logic 130 calculates the working set size 212 as twenty-five.

Once calculated, the throttling logic 130 compares the working set size 212 to a thrashing threshold 214. Broadly, the thrashing threshold 214 is a specific value for the degree of thrashing/working set size 212 above which throttling the prefetch requests results in a net increase in performance, e.g., an increase in data access speed for the processor 104. In one or more instances, the thrashing threshold 214 is a function of the cache associativity of the level two cache 124. In a specific but non-limiting example, the thrashing threshold 214 is a multiplier of one-and-a-half of the cache associativity of the level two cache 124, which is sixteen. Therefore, the thrashing threshold 214 is twenty-four in this example.

As shown, the throttling logic 130 is configured to maintain a counter 216. The counter 216 is an electronic circuit that increments or decrements a value of the counter 216 after each respective time interval 208 based on whether the working set size 212 calculated during the respective time interval equals or exceeds the thrashing threshold 214. If the working set size 212 calculated during the respective time interval 208 is greater than or equal to the thrashing threshold 214 (i.e., "threshold met" in the illustrated example 200), the throttling logic 130 detects that the workload 202 is thrashing the level two cache 124 and increments the counter 216, e.g., increment 218. If, however, the working set size 212 calculated during the respective time interval 208 is less than the thrashing threshold 214 (i.e., "threshold not met" in the illustrated example 200), the throttling logic 130 detects that the workload 202 is not thrashing the level two cache 124 and decrements the counter 216, e.g., decrement 220.

The above-described process is repeated over multiple successive time intervals 208. For instance, the working set size 212 is calculated based on the unique accesses to the monitored cache indices 210 during a time interval 208, and thereafter, the counter 216 is incremented (e.g., from zero to one) based on the calculated working set size 212 being greater than or equal to the thrashing threshold 214. The working set size 212 is again calculated based on the unique accesses to a different subset of the monitored cache indices 210 during the next time interval 208, and thereafter, the counter 216 is decremented (e.g., from one to zero) based on the calculated working set size 212 being less than the thrashing threshold 214, and so on. Notably, time intervals 208 during which thrashing is detected are referred to herein as "thrashing time intervals," while time intervals 208 during which thrashing is not detected are referred to herein as "non-thrashing time intervals."

In one or more implementations, the counter 216 is a saturating counter. Broadly, a saturating counter is a counter having a range of values from a maximum value to a minimum value. Further, the saturating counter is configured to remain at a the maximum value responsive to being prompted to increment above the maximum value, and remain at the minimum value responsive to being prompted to decrement below the minimum value. Consider an example in which the counter 216 is a two-bit saturating counter having four possible values, e.g., zero, one, two, or three. If thrashing is detected during a time interval 208 while the counter 216 is set to a value of three, the counter 216 remains at a value of three after the thrashing time interval 208. Similarly, if thrashing is not detected during a time interval 208 while the counter 216 is set to a value of zero, the counter 216 remains at a value of zero after the thrashing time interval 208.

Responsive to updating the counter 216 after each time interval 208, the throttling logic 130 compares the counter 216 to a counter threshold 222. Broadly, the counter threshold 222 is a specific value of the counter 216, which when equaled or exceeded, triggers the hardware prefetcher 128 to throttle issuance of prefetch requests. If the counter 216 is greater than or equal to the counter threshold 222 after a respective time interval 208 (i.e., "threshold met" in the illustrated example 200), the throttling logic 130 throttles prefetch requests issued by the hardware prefetcher 128, i.e., enable throttling 224. If, however, the counter 216 is less than the counter threshold 222 after a respective time interval 208 (i.e., "threshold not met" in the illustrated example 200), the throttling logic 130 disables throttling of prefetch requests issued by the hardware prefetcher 128, i.e., disable throttling 226. Accordingly, when throttling is enabled, the throttling logic 130 continues to throttle prefetch requests issued by the hardware prefetcher 128 until the counter 216 falls below the counter threshold 222. Similarly, when throttling is disabled, the throttling remains disabled (e.g., the hardware prefetcher 128 issues prefetch requests without restriction) until the counter 216 meets or exceeds the counter threshold 222.

Consider an example in which the counter 216 is a two-bit saturating counter (e.g., having potential values zero, one, two, or three) and the counter threshold 222 is a value of three (e.g. 11 in binary). In this example, the counter 216 is set to a value of one, and as such, throttling is initially disabled. After a thrashing time interval 208 occurs, the throttling logic 130 increments the counter 216 to two, and compares the counter 216 to the counter threshold 222. Since the counter 216 is less than three, throttling remains disabled for the next time interval 208. Again, thrashing is detected during the next time interval 208, and as such, the throttling logic 130 increments the counter 216 to three, and compares the counter 216 to the counter threshold 222. Since the counter 216 is equal to three (e.g., the counter threshold 222), throttling is enabled for one or more subsequent time intervals 208. For example, throttling is enabled until the counter 216 is decremented below a value of three, e.g., the throttling is disabled when the counter 216 is decremented to a value of two in response to a non-thrashing time interval being detected.

In at least one alternative implementation, the throttling logic 130 determines whether to throttle prefetch requests during a time interval 208 based solely on whether throttling is detected during the immediately previous time interval 208, i.e., without maintaining the counter 216 or utilizing the counter threshold 222. For instance, if the working set size 212 calculated during a first time interval 208 is equal to or greater than the thrashing threshold 214, the throttling logic 130 enables prefetch throttling during a second time interval 208, e.g., the immediately subsequent time interval. Further, if the working set size 212 calculated during the second time interval 208 is less than the thrashing threshold 214, the throttling logic 130 disables prefetch throttling during a third time interval 208, e.g., the immediately subsequent time interval. Accordingly, when throttling is enabled in this alternative implementation, the throttling logic 130 continues to throttle prefetch requests issued by the hardware prefetcher 128 until the occurrence of just one non-thrashing time interval. Similarly, when throttling is disabled in this alternative implementations, the throttling of prefetch requests remains disabled until the occurrence of just one thrashing time interval.

In sum, the described techniques make use of a "multi-interval thrashing evaluation protocol" in which the throttling decision is based on whether the counter 216 is above the counter threshold 222, e.g., whether thrashing is detected over multiple previous time intervals 208. Alternatively, the described techniques make use of a "singular interval thrashing evaluation protocol" in which the throttling decision is based on whether thrashing is detected in the immediately previous time interval. The reason for these different protocols is due to the thrashing behavior exhibited by different types of workloads.

By way of example, certain workloads, such as Protocol buffers (Protobuff) workloads, utilize long access streams to consecutive memory addresses, with the accessed data often being evicted before being reused. Due to this, Protobuff workloads often exhibit thrashing behavior for many time intervals, and then exhibit non-thrashing behavior for many time intervals. Therefore, Protobuff workloads benefit from the singular interval thrashing evaluation protocol. This is because throttling is enabled immediately responsive to the workload exhibiting thrashing behavior, and as such, there are more time intervals during which the processor 104 experiences performance benefits by way of throttling the thrashing workload. Similarly, throttling is disabled immediately responsive to the workload exhibiting non-thrashing behavior, and as such, there are more time intervals in which the processor 104 experiences performance gains by way of prefetching soon to be accessed data during the non-thrashing workload.

Other types of workloads, however, exhibit spikes in thrashing behavior. For example, these workloads often exhibit thrashing behavior for just one or two time intervals 208 before returning to exhibiting non-thrashing behavior. Accordingly, if prefetching were enabled responsive to just one thrashing time interval, throttling would often be enabled during subsequent non-thrashing time intervals. Since prefetching increases performance during non-thrashing time intervals, enabling throttling during non-thrashing time intervals is detrimental to performance. Accordingly, these workloads benefit from the multi-interval thrashing evaluation protocol. This is because, throttling is enabled solely after thrashing behavior of the workload is observed for a majority of the past few time intervals 208, but remains disabled responsive to short spikes in thrashing behavior of the workload.

It should be noted that the throttling logic 130 of the described techniques exists outside the macro structure of the level two cache 124, and as such, the described techniques do not rely on any modifications to the macro structure of the level two cache 124. This contrasts with conventional techniques which utilize, for example, additional bits in the tag array to identify whether data is prefetched data and/or demand requested data, as well as additional logic in the cache controller of the level two cache 124 to populate and/or understand the additional bits.

Further, although not depicted, the throttling logic 130 is duplicated in the level two caches 124 of the other cores of the multi-core processor 104 in one or more implementations, and without utilizing additional hardware to coordinate between the multiple cores. This is possible because the throttling logic 130 of a respective core of the processor 104 detects that a workload is thrashing in the level two cache 124 based solely on the accesses 204 to the level two cache 124 of the respective core, i.e., the thrashing detection and throttling decision of the throttling logic 130 of the respective core is independent and orthogonal of the thrashing behavior exhibited in the caches of different cores of the processor 104.

Although described and depicted herein as implemented in the hardware prefetcher 128 associated with the level two cache 124, it is to be appreciated that the throttling logic 130 is additionally or alternatively implementable as part of a software prefetching technique and/or a hybrid technique involving software prefetching and hardware prefetching. In at least one example, a compiler of the processor 104 generates prefetch requests (e.g., rather than, or in addition to the hardware prefetcher 128) at compile time. In this example, the throttling logic 130 calculates the working set size 212 based on the unique accesses to the level two cache 124 in a similar manner as described above. Further, the throttling logic 130 sets a register (e.g., to a value of zero) that is readable by the compiler based on the working set size 212 being less than the thrashing threshold 214 over one or more time intervals 208. Similarly, the throttling logic 130 sets the register (e.g., to a value of one) based on the working set size 212 being greater than the thrashing threshold over one or more time intervals 208.

In this example, the compiler periodically reads the register. Thus, when the register indicates that a currently executing workload is not thrashing the level two cache 124 (e.g., the register is set to a value of zero), the compiler sends the generated prefetch requests to the cache system 116. Furthermore, when the register indicates that a currently executing workload is thrashing the level two cache 124 (e.g., the register is set to a value of one), the compiler terminates sending prefetch requests to the cache system 116.

As previously mentioned, the described techniques are extendable to cache systems 116 having differing number of caches and different hierarchical structures. Indeed, the throttling logic 130 detects thrashing behavior of a workload in accordance with the described techniques by monitoring accesses 204 to a last non-shared cache level of the cache system 116, e.g., whether the last non-shared cache level is the level two cache 124 or some other cache level. Consider an alternative example in which the cache system 116 includes just two cache levels—a first cache level that is private or non-shared among the cores of the processor 104, and a second cache level that is shared among the cores of the processor 104. In this alternative example, the throttling logic 130 throttles prefetch requests based on thrashing behavior exhibited by a workload in the first cache level.

FIG. 3 depicts a procedure 300 in an example implementation of prefetch throttling based on cache thrashing. In the procedure 300, a degree of thrashing exhibited by a workload in a level two cache of a cache system is periodically measured, in successive time intervals, based on accesses of the workload to the level two cache (block 302). By way of example, the cache system 116 receives a workload 202 that includes accesses 204 to the level two cache 124. Further, the throttling logic 130 periodically measures, in successive time intervals, the degree of thrashing in the level two cache 124 as a working set size 212 based on the accesses 204. During a respective time interval 208, for instance, the throttling logic 130 selects a subset of the cache indices 206 of the level two cache 124, e.g., the monitored cache indices 210. Further, the throttling logic 130 counts a number of the accesses 204 to the monitored cache indices 210 of the level two cache 124 having different or unique memory addresses. The working set size 212 is the average of the number across the monitored cache indices 210.

A counter is maintained in which the counter is incremented responsive to thrashing time intervals during which the degree of thrashing was greater than or equal to a thrashing threshold, and the counter is decremented responsive to non-thrashing time intervals during which the degree of thrashing was less than the threshold (block 304). By way of example, the throttling logic 130 maintains the counter 216. If the working set size 212 calculated for a respective time interval 208 is greater than or equal to the thrashing threshold 214, then the throttling logic 130 increments the counter 216. In contrast, the throttling logic 130 decrements the counter 216 if the working set size 212 calculated for a respective time interval 208 is less than the thrashing threshold 214.

Prefetch requests issued by a hardware prefetcher associated with the level two cache are throttled based on the counter being greater than or equal to a counter threshold (block 306). After the counter 216 is incremented or decremented in response to a respective time interval 208 having ended, the throttling logic 130 compares the counter 216 to a counter threshold 222. If the counter 216 is greater than or equal to the counter threshold 222, the throttling logic 130 enables throttling of prefetch requests issued by the hardware prefetcher 128 for one or more subsequent time intervals. However, if the counter 216 is less than the counter threshold 222, the throttling logic disables throttling of prefetch requests issued by the hardware prefetcher for one or more subsequent time intervals.

FIG. 4 depicts a procedure 400 in an example implementation of prefetch throttling based on cache thrashing. In the procedure 400, a workload is monitored, and the workload includes accesses to a level two cache of a cache system (block 402). By way of example, the throttling logic 130 monitors accesses 204 of a workload 202 to the level two cache 124.

A degree of thrashing exhibited by the workload in the level two cache is periodically measured, in successive time intervals, based on the accesses (block 404). By way of example, the throttling logic 130 periodically measures, in successive time intervals, the degree of thrashing in the level two cache 124 as a working set size 212. During a respective time interval 208, for instance, the throttling logic 130 selects a subset of the cache indices 206 of the level two cache 124, e.g., the monitored cache indices 210. Further, the throttling logic 130 counts a number of the accesses 204 to the monitored cache indices 210 of the level two cache 124 having different or unique memory addresses. The working set size 212 is the average of the number across the monitored cache indices 210.

Throttling of prefetch request issued by a hardware prefetcher associated with the level two cache is enabled responsive to a first time interval during which the degree of thrashing was greater than or equal to a thrashing threshold (block 406). By way of example, the working set size 212 calculated for a first time interval 208 is greater than the thrashing threshold. Thus, responsive to termination of the first time interval 208, the throttling logic 130 throttles prefetch requests issued during a second time interval 208, e.g., the immediately subsequent time interval. Notably, the decision to throttle prefetch requests during the second time interval 208 is based solely on the thrashing behavior exhibited by the workload in the level two cache 124 during the first time interval 208.

The throttling of prefetch requests issued by the hardware prefetcher is disabled responsive to a second time interval during which the degree of thrashing was less than the thrashing threshold (block 408). By way of example, the working set size calculated for the second time interval 208 is less than the thrashing threshold. Thus, responsive to termination of the second time interval 208, the throttling logic 130 disables the throttling of the prefetch requests issued during a third time interval 208, e.g., the immediately subsequent time interval. Notably, the decision to disable prefetch throttling during the third time interval 208 is based solely on the non-thrashing behavior exhibited by the workload in the level two cache 124 during the second time interval 208.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the device 102, the processor 104, the memory system 106 having the volatile memory 108 and the non-volatile memory 110, the execution units 112, the load-store units 114, the cache system 116, the hardware prefetcher 128, and the throttling logic 130) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processor, comprising:
a cache system including a level two cache; and
prefetching circuitry associated with the level two cache, the prefetching circuitry configured to:
    monitor a workload that includes accesses to the level two cache;
    measure a degree of thrashing exhibited by the workload in the level two cache based on the accesses; and
    enable prefetch throttling by reducing or eliminating prefetch requests issued by the prefetching circuitry based on the degree of thrashing being greater than or equal to a thrashing threshold.

2. The processor of claim 1, wherein the level two cache includes multiple cache indices, and the prefetching circuitry is configured to measure the degree of thrashing based on the accesses to a subset of the multiple cache indices.

3. The processor of claim 2, wherein to measure the degree of thrashing, the prefetching circuitry is configured to:
count a number of the accesses to cache indices of the subset having different memory addresses; and
calculate a working set size as an average of the number across the cache indices in the subset.

4. The processor of claim 3, wherein the thrashing threshold is a function of cache associativity of the level two cache, and the prefetch throttling is enabled based on the working set size being greater than or equal to the thrashing threshold.

5. The processor of claim 1, wherein the prefetching circuitry is configured to:

periodically measure, in successive time intervals, the degree of thrashing; and compare, after each respective time interval, the degree of thrashing exhibited by the workload during the respective time interval to the thrashing threshold.

6. The processor of claim 5, wherein the prefetching circuitry is configured to enable the prefetch throttling during a time interval based on the degree of thrashing being greater than or equal to the thrashing threshold during an immediately previous time interval.

7. The processor of claim 5, wherein the prefetching circuitry is configured to disable the prefetch throttling during a time interval based on the degree of thrashing being less than the thrashing threshold during an immediately previous time interval.

8. The processor of claim 5, wherein the prefetching circuitry is configured to:

increment a counter responsive to thrashing time intervals during which the degree of thrashing was greater than or equal to the thrashing threshold; and decrement the counter responsive to non-thrashing time intervals during which the degree of thrashing exhibited by the workload was less than the thrashing threshold.

9. The processor of claim 8, wherein the prefetching circuitry is configured to enable the prefetch throttling based on the counter being greater than or equal to a counter threshold.

10. The processor of claim 8, wherein the prefetching circuitry is configured to disable the prefetch throttling based on the counter being less than a counter threshold.

11. A system, comprising:

a memory system; and a processor communicatively coupled to the memory system, the processor including a cache system having a level two cache, the level two cache including prefetching circuitry configured to perform operations including:

periodically measuring, in successive time intervals, a degree of thrashing exhibited by a workload in the level two cache based on accesses of the workload to the level two cache;

maintaining a counter, the counter being incremented responsive to thrashing time intervals during which the degree of thrashing was greater than or equal to a thrashing threshold, the counter being decremented responsive to non-thrashing time intervals during which the degree of thrashing was less than the thrashing threshold; and throttling prefetch requests issued by the prefetching circuitry based on the counter being greater than or equal to a counter threshold.

12. The system of claim 11, wherein the level two cache includes multiple cache indices, and the degree of thrashing is measured, for a respective time interval, based on the accesses to a subset of the multiple cache indices during the respective time interval.

13. The system of claim 12, wherein the degree of thrashing is measured, for the respective time interval, by:

counting a number of the accesses to cache indices of the subset having different memory addresses during the respective time interval; and calculating a working set size as an average of the number across the cache indices in the subset.

14. The system of claim 13, wherein counting the number for a particular cache index of the subset during the respective time interval includes:

sampling the accesses to the particular cache index until a maximum number of the accesses have been sampled, the maximum number being a function of cache associativity of the level two cache; and counting, responsive to completion of the respective time interval, the number from the sampled accesses.

15. The system of claim 13, wherein the thrashing threshold is a function of cache associativity of the level two cache, and the counter is incremented or decremented based on a comparison of the working set size to the thrashing threshold.

16. The system of claim 11, the operations further comprising disabling the throttling of the prefetch requests issued by the prefetching circuitry based on the counter being less than the counter threshold.

17. The system of claim 11, wherein the counter is a saturating counter associated with a range of values, the saturating counter remaining at a value to which the saturating counter is set responsive to being prompted to increment or decrement the saturating counter beyond the range of values.

18. A method, comprising:

monitoring, by a hardware prefetcher associated with a level two cache of a cache system, a workload that includes accesses to the level two cache;

periodically measuring, by the hardware prefetcher and in successive time intervals, a degree of thrashing exhibited by the workload in the level two cache based on the accesses;

enabling, by the hardware prefetcher, prefetch throttling by reducing or eliminating prefetch requests issued by the hardware prefetcher responsive to a first time interval during which the degree of thrashing was greater than or equal to a thrashing threshold; and disabling, by the hardware prefetcher, the prefetch throttling responsive to a second time interval during which the degree of thrashing was less than the thrashing threshold.

19. The method of claim 18, wherein the level two cache includes multiple cache indices, and periodically measuring the degree of thrashing includes:

counting, during a respective time interval, a number of the accesses to a monitored subset of the multiple cache indices having different memory addresses; and calculating a working set size as an average of the number across cache indices in the monitored subset.

20. The method of claim 19, wherein the prefetch throttling is enabled based on the working set size calculated for the first time interval being greater than or equal to the thrashing threshold, and the prefetch throttling is disabled based on the working set size calculated for the second time interval being less than the thrashing threshold.

* * * * *